(12) United States Patent
Esmaili et al.

(10) Patent No.: US 9,547,822 B2
(45) Date of Patent: Jan. 17, 2017

(54) METHODS FOR IMPROVED PRODUCTION AND DISTRIBUTION

(75) Inventors: Ali Esmaili, Emmaus, PA (US); Catherine Catino Latshaw, Fogelsville, PA (US); Sharad Kumar, Orefield, PA (US); Montgomery M. Alger, Hellertown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 386 days.

(21) Appl. No.: 13/994,853

(22) PCT Filed: May 12, 2011

(86) PCT No.: PCT/US2011/036203
§ 371 (c)(1),
(2), (4) Date: Jun. 17, 2013

(87) PCT Pub. No.: WO2012/154182
PCT Pub. Date: Nov. 15, 2012

(65) Prior Publication Data
US 2013/0275175 A1    Oct. 17, 2013

(51) Int. Cl.
*G06N 3/12*     (2006.01)
*F17D 1/00*     (2006.01)
*G06Q 50/06*    (2012.01)
*G06Q 10/06*    (2012.01)
*F25J 3/04*     (2006.01)

(52) U.S. Cl.
CPC ....... *G06N 3/12* (2013.01); *F17D 1/00* (2013.01); *F25J 3/04848* (2013.01); *F25J 3/04951* (2013.01); *G06Q 10/06* (2013.01); *G06Q 10/063* (2013.01); *G06Q 10/067* (2013.01); *G06Q 10/06313* (2013.01); *G06Q 50/06* (2013.01); *F25J 2290/10* (2013.01); *F25J 2290/60* (2013.01)

(58) Field of Classification Search
None
See application file for complete search history.

(56) References Cited

U.S. PATENT DOCUMENTS 7,092,893 B2   8/2006   Megan et al.
7,627,493 B1   12/2009  Sarthi et al.
(Continued)

OTHER PUBLICATIONS

Chittu, V., and N. Sumathi. "A modified genetic algorithm initializing k-means clustering." Global Journal of Computer Science and Technology 11.2 (2011).*

(Continued)

*Primary Examiner* — Kakali Chaki
*Assistant Examiner* — Kevin W Figueroa
(74) *Attorney, Agent, or Firm* — Eric J. Schaal

(57) ABSTRACT

A computer-implemented system and method for producing and distributing at least one product from at least one plant to at least one customer where discretized plant production data, filtered customer sourcing data, forecasted customer demand data, and forecasted plant electricity pricing data are input into a modified genetic algorithm and an electronic processor solves the modified genetic algorithm and outputs the solution to an interface. The system and method is flexible and can incorporate data as it becomes available to yield intermediate solutions for quick decision making.

18 Claims, 8 Drawing Sheets

(56) References Cited

U.S. PATENT DOCUMENTS

| | | | |
|---|---|---|---|
| 2002/0017113 A1* | 2/2002 | Seiver | F25J 3/04412 |
| | | | 62/656 |
| 2004/0015392 A1 | 1/2004 | Hammel et al. | |
| 2004/0148264 A1 | 7/2004 | Megan | |
| 2004/0215529 A1* | 10/2004 | Foster | G06Q 30/06 |
| | | | 705/26.1 |
| 2005/0027660 A1 | 2/2005 | Leroux et al. | |
| 2006/0241986 A1 | 10/2006 | Harper | |
| 2006/0260312 A1 | 11/2006 | Ingersoll | |
| 2007/0050223 A1 | 3/2007 | Malitski | |
| 2007/0208436 A1* | 9/2007 | Das | G05B 13/0265 |
| | | | 700/44 |
| 2008/0030377 A1 | 2/2008 | Kawabe et al. | |
| 2008/0059284 A1* | 3/2008 | Solotorevsky | G06Q 10/04 |
| | | | 705/7.38 |

OTHER PUBLICATIONS

Philip Kilby, Patrick Prosser, and Paul Shaw, "A Comparison of Traditional and Constraint-based Heuristic Methods on Vehicle Routing Problems with Side Constraints," Constraints vol. 5, pp. 389-414 (2000).

Olli Braysy, Wout Dullaert, and Michel Gendreau, "Evolutionary Algorithms for the Vehicle Routing Problem with Time Windows," Journal of Heuristics, vol. 10, pp. 587-611, 2004.

Michael Polacek, Richard F. Hartl and Karl Doerner and Marc Reimann, "A Variable Neighborhood Search for the Multi Depot Vehicle Routing Problem with Time Windows," Journal of Heuristics, vol. 10, pp. 613-627, 2004.

Tolga Bektas, "The multiple traveling salesman problem: an overview of formulations and solution procedures," Omega vol. 34, pp. 209-219 (2006).

Michel Gendreau, Gilbert Laporte, and Rene Seguin, "Stochastic vehicle routing," European Journal of Operational Research vol. 88, pp. 3-12 (1996).

Ana Muriel and David Simchi-Levi, "Chapter 2 Supply Chain Design and Planning—Applications of Optimization Techniques for Strategic and Tactical Models," Handbooks in OR & MS, vol. 11, pp. 17-93 (2003).

International Patent Application No. PCT/US2011/036203 with International Filing Date of May 12, 2011. International Search Report and Written Opinion dated Sep. 1, 2011, 9 pages.

International Application No. PCT/US2010/035973 with International Filing Date May 24, 2010. International Search Report date mailed Jul. 26, 2010, 1 page.

\* cited by examiner

METHODS FOR IMPROVED PRODUCTION AND DISTRIBUTION

BACKGROUND

Air separation plants produce both gaseous and liquid nitrogen, oxygen, and argon, for example, by cryogenic distillation. When a liquid product is generated, it is traditionally stored in large cryogenic storage tanks until it is needed. When needed, the liquid product is withdrawn from the cryogenic liquid storage tank and shipped to a customer or series of customers from the plant site via trucks or other shipping means. In contrast to liquid products, gaseous products are co-produced and typically sent to customers via a pipeline. The demand for liquid and/or gaseous products can vary, thus, plant rates are adjusted to meet such demands.

The costs incurred to supply such products to customers include the production cost to make the product and the distribution cost to supply that customer. Traditionally, a significant portion of the production cost is the electricity costs charged by the utility company. These electricity costs can be highly variable with price changes happening as frequently as every fifteen minutes in some areas. The electricity costs, therefore, constitute a highly variable production cost for a network of air separation plants.

Once the product has been produced, the product is then typically supplied to a large number of customers in a specific geography. The production and delivery of products from multiple production sites in a region, or continent, to multiple customers is a common optimization problem faced by many companies. In particular, the optimization of the coupled problem of determining production plans at a multitude of production sites along with determining sourcing plans to meet predicted and requested customer demands is challenging. The highly variable production cost, noted above, coupled with different production capabilities and efficiencies for each plant as well as the variability in customer demands, makes liquid production decisions and customer sourcing decisions quite complex for a network of plants and customers. In these cases, the distribution problem is often tightly coupled to the production and/or storage scheme: where and when should the product be manufactured and stored in order to facilitate the lowest total cost of production, storage, and delivery?

In the case of a network of plants producing a commodity product (e.g., liquid oxygen, liquid nitrogen, liquid argon, etc.) and then supplying the product to customers via a distribution network, there are infinite feasible scenarios for production rates at each plant since each plant can make varying amounts of each product within a given range. Simultaneously, on the distribution side, all available plant sources are taken into account when making sourcing decisions. These factors among others can lead to an exorbitant size in the combined production-distribution optimization problem where the intent is to minimize production and distribution costs and/or maximize profits for a network of plants and customers. Hence the overall network optimization problem becomes difficult to solve in even a reasonable timeframe because of the large combinatorial optimization problem.

Efforts to reduce the size of the problem on the production side have typically considered an individual plant operation without significant integration into the entire network. In other words, the plants are run over a narrow range based on constraints and past experience with those production ranges and/or plant operation is based on an optimal point of operation for that specific plant resulting in a solution that is sub-optimal network wide. In general, efforts to reduce the number of variables on the distribution side have not been made since the distribution optimization problem by itself can be solved in reasonable timeframes using current optimization systems. However, prevalent solutions still consider all possible plants as production sources, thereby increasing the problem size. In addition, some of the suggested solutions might be impractical to implement owing to constraints such as customer preference, contractual factors, etc.

Traditional approaches to the network optimization problem have mostly handled the production optimization problem and the distribution optimization problem separately in order to reduce the problem size to a manageable number of variables and get a solution in a reasonable time frame. For example, in U.S. Patent Application No. US 2006 0241986, a Genetic Algorithm was used to determine optimal production at source plants and a separate Ant Colony optimizer was used to determine optimal distribution solutions. The outputs from both optimizers were compared separately using a third optimization co-ordination module that ran a simulation to evaluate the effectiveness of different solutions suggested by each individual optimizer.

The resulting solutions are, however, sub-optimal because the whole decision space of combined production and distribution scenarios is not considered simultaneously. Many times, a sub-optimal approach like the one just described may be followed by companies who have already invested large sums of money for stand-alone optimizers to do either the production optimization or distribution optimization separately and adding a third optimizer on top is the most cost-effective option, albeit not the one that gives the most optimal solution to the combined production and distribution optimization problem itself.

Methods described in the literature also use various optimization algorithms to solve network optimization problems. One approach to solving these types of network optimization problems is discussed in U.S. Pat. No. 7,092,893, where the control of liquid production in a network of air separation plants and customers was performed using a mixed-integer non-linear programming (MINLP) technique. MINLP typically suffers from two main limitations when applied to these types of network optimization problems: (1) MINLP does not have the flexibility to solve for intermediate solutions in a reasonable time frame; and (2) when new or intermediate data is available, the only way to incorporate that new data is to run the entire optimization sequence again from the beginning. This inability to include new data from a variety of incoming data feeds as well as making intermediate solutions available are big impediments for MINLP to be used to solve network optimization problems in the most efficient, implementable, and optimized fashion. The other limitation of MINLP is that the solution obtained without the use of the new or intermediate data might also be incorrect to implement, since the situation might have changed substantially during the time it takes for the optimizer to run. Hence, the solution obtained without incorporating the latest data may not lead to the minimum cost and/or the maximum profit.

The industry has used Genetic algorithms (GA) for optimization for a long time and for a variety of applications. GA refers to a method of solving optimization problems based on a natural selection process similar to the Darwinian process of biological evolution. Starting with an initial or seed population of potential solutions, the GA selects the best or "fittest" solutions to pass along to the next step. At each step, or generation, the GA selects individuals from the population to generate new solutions and eventually evolves toward an optimal solution. The GA can be applied to most optimization problems, but is best suited to optimization problems where the objective function is discontinuous or non-linear. In the case of network optimization for producing and distributing products, including liquid products, from a number of plants to a number of customers, the electricity contracts/costs are highly non-linear. Different exemplary applications of GA include, for example, U.S. Pat. No. 7,693,653, where a GA is disclosed to dynamically determine optimal paths for unmanned vehicles to complete military missions. Also in U.S. Pat. No. 7,065,420, GA is used to determine optimal aspects of parts in the CAD design phase, thereby assessing their feasibility in the manufacturing phase. Use of GA has also been applied in Supply Chain Management problems. For example, in U.S. Pat. No. 7,643,974, use of a GA to determine optimal sourcing in a pipeline system is disclosed.

While computational power has increased to the point that elaborate optimization techniques have become practical for use in some industries, optimization of large networks is still very computationally taxing. Often, resulting solutions can take an inordinately long time to solve and may not even be applicable at a later time period owing to fluctuation in the input data, which goes into the optimization problem. In the case of supply chain management of very large distribution networks where there are numerous sourcing and customer sites, and, therefore, billions of potential scenarios exist, the amount of time for an optimal solution to be generated will exceed the time period in which it can be practically implemented.

Thus, there is a need in the art for an optimization routine to solve the combined production and distribution problem that has the flexibility to incorporate data as it becomes available and will yield intermediate solutions for quick decision making. Also there is a need to reduce the size of the problem, i.e., reduce the number of decisions that the optimizer must make, but at the same time, the optimizer result must be a practical, implementable solution.

SUMMARY

The disclosed embodiments satisfy the need in the art by providing a system and method for optimizing the combined production and distribution problem that has the flexibility to incorporate data as it becomes available and will yield intermediate solutions for quick decision making. The disclosed embodiments provide a method and system that reduces the decision space for the combined production and distribution optimization problem using a modified genetic algorithm technique. The modified Genetic Algorithm (GA) approach overcomes some of the traditional deficiencies by reducing the problem size intelligently and allowing for intermediate data incorporation, thus, providing a method and system for solving the combined production and distribution optimization problem in an efficient manner.

In one embodiment, a computer-implemented method for producing and distributing at least one product from at least one plant to at least one customer is disclosed, the method comprising the steps of: obtaining with an electronic processor from an electronic data repository continuous plant data from the at least one plant; segmenting the continuous plant data with the electronic processor into discrete plant production modes to obtain discretized plant production data; obtaining with the electronic processor from an electronic data repository historical customer sourcing data from the at least one customer; filtering the historical customer sourcing data with the electronic processor to obtain filtered customer sourcing data; obtaining with the electronic processor from an electronic data repository customer usage data; modeling the customer usage data for at least one time with the electronic processor to obtain forecasted customer demand data; obtaining with the electronic processor from an electronic data repository historical plant weather data for the at least one plant; modeling the historical plant weather data for the at least one plant for at least one time with the electronic processor to obtain forecasted plant weather data; obtaining with the electronic processor from an electronic data repository historical plant electricity pricing data for the at least one plant; modeling the historical plant electricity pricing data and the forecasted plant weather data for the at least one plant for at least one time with the electronic processor to obtain forecasted plant electricity pricing data; inputting with the electronic processor the discretized plant production data, filtered customer sourcing data, forecasted customer demand data, and forecasted plant electricity pricing data into the modified genetic algorithm; solving with the electronic processor the modified genetic algorithm; and outputting with the electronic processor the solution to the modified genetic algorithm to an interface.

In another embodiment, a computer system for producing and distributing at least one product from at least one plant to at least one customer is disclosed, the system comprising: an electronic data repository; and an electronic processor, configured to: obtain from the electronic data repository continuous plant data from the at least one plant; segment the continuous plant data into discrete plant production modes to obtain discretized plant production data; obtain from the electronic data repository historical customer sourcing data from the at least one customer; filter the historical customer sourcing data to obtain filtered customer sourcing data; obtain from the electronic data repository customer usage data; model the customer usage data for at least one time to obtain forecasted customer demand data; obtain from the electronic data repository historical plant weather data for the at least one plant; model the historical plant weather data for the at least one plant for at least one time to obtain forecasted plant weather data; obtain from the electronic data repository historical plant electricity pricing data for the at least one plant; model the historical plant electricity pricing data and the forecasted plant weather data for the at least one plant for at least one time to obtain forecasted plant electricity pricing data; input the discretized plant production data, filtered customer sourcing data, forecasted customer demand data, and forecasted plant electricity pricing data into the modified genetic algorithm; solve the modified genetic algorithm; and output the solution to the modified genetic algorithm to an interface.

In yet another embodiment, a computer-readable storage medium encoded with instructions configured to be executed by an electronic processor, the instructions which, when executed by the electronic processor, cause the performance of a method for producing and distributing at least one product from at least one plant to at least one customer is disclosed, the method comprising: obtaining with the electronic processor from an electronic data repository continuous plant data from the at least one plant; segmenting the continuous plant data with the electronic processor into discrete plant production modes to obtain discretized plant production data; obtaining with the electronic processor from an electronic data repository historical customer sourcing data from the at least one customer; filtering the historical customer sourcing data with the electronic processor to obtain filtered customer sourcing data; obtaining with the electronic processor from an electronic data repository customer usage data; modeling the customer usage data for at least one time with the electronic processor to obtain forecasted customer demand data; obtaining with the electronic processor from an electronic data repository historical plant weather data for the at least one plant; modeling the historical plant weather data for the at least one plant for at least one time with the electronic processor to obtain forecasted plant weather data; obtaining with the electronic processor from an electronic data repository historical plant electricity pricing data for the at least one plant; modeling the historical plant electricity pricing data and the forecasted plant weather data for the at least one plant for at least one time with the electronic processor to obtain forecasted plant electricity pricing data; inputting with the electronic processor the discretized plant production data, filtered customer sourcing data, forecasted customer demand data, and forecasted plant electricity pricing data into the modified genetic algorithm; solving with the electronic processor the modified genetic algorithm; and outputting with the electronic processor the solution to the modified genetic algorithm to an interface.

BRIEF DESCRIPTION OF SEVERAL VIEWS OF THE DRAWINGS

The above and other objects and advantages will become apparent to one skilled in the art based on the following detailed description of the invention, of which.

DETAILED DESCRIPTION

Figure 1A:
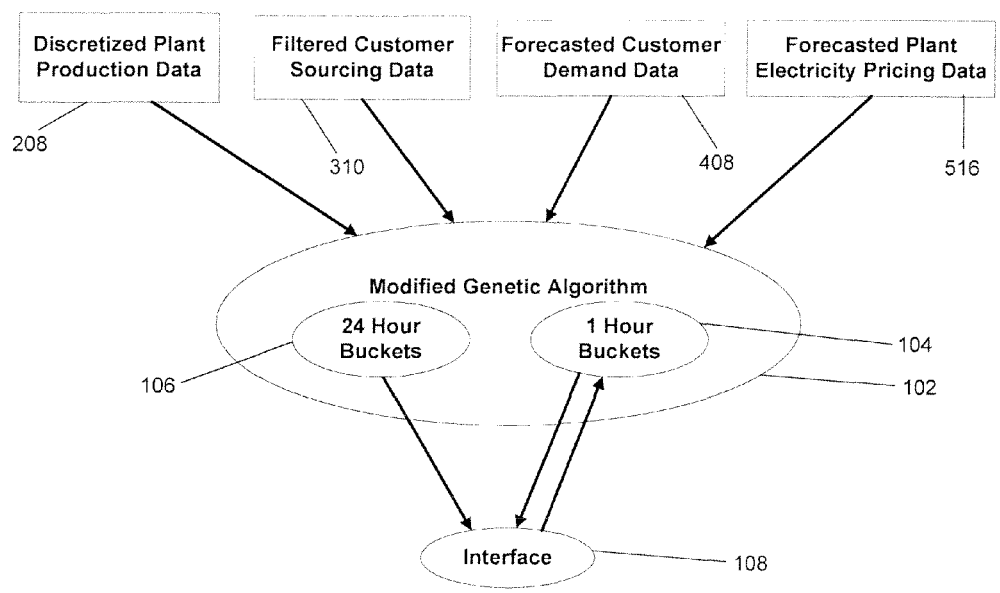
FIG. 1(a) is a flow diagram illustrating the overall system and method in accordance with one embodiment of the current invention.

The foregoing summary, as well as the following detailed description of exemplary embodiments, is better understood when read in conjunction with the appended drawings. For the purpose of illustrating embodiments, there is shown in the drawings exemplary constructions; however, the invention is not limited to the specific methods and instrumentalities disclosed.

Embodiments of the present invention include specifying an integer or bit-string population in the GA to describe the operating modes of each plant and the customer sourcing decisions to simplify the overall production and distribution optimization problem. Since the GA has only to consider the discrete modes of plant operation, the GA considers a solution space that is far smaller than the potentially otherwise infinite space of production amounts that exist with continuous variables. This simplification of the network by using discrete modes enables aspects of this approach to apply the genetic algorithm to optimize based on said modes. By specifying discrete variables in the system, the GA runs efficiently and produces solutions in minutes that would otherwise take many hours.

In this novel approach, each plant can run in one of a discrete set of operating modes, where each mode is linked to a fundamental state of the system, e.g., a compressor being on or off. The mode here is defined as a representative point of operation associated with a defined set of equipment running to result in concomitant production rates and electricity usage. The approach first focuses on simplifying the possible modes of operation for each plant and then focuses on determining optimal decisions for every binary discrete decision. Such discretization of the decision space is carried through not only on the plant operating modes, but also on customer sourcing from a plurality of plants. As a result, the decisions of how a customer will get sourced are also discretized between a series of allowed number of sources to result in a set of binary variables. Again this approach focuses on simplification of the allowed decision space followed by an optimization. Finally, the approach is also novel in its utilization of the genetic algorithm methods with intermediate data incorporation to solve such a problem.

One embodiment of the invention provides an automated optimization method for determining best production and distribution of product where there is little differentiation in the product generated at each of the plants, more specifically for a commodity product. Embodiments of the invention described here are the optimization of air separation plants, for example, and their customers who demand liquid nitrogen, liquid oxygen, liquid argon, or some combination, however, the invention is not limited to such distribution networks.

An optimization method for liquid separation plants to ensure lowest cost or maximum profit will need to consider a large number of factors. Primarily, the plant energy requirement will need to be minimized since the majority of the production cost is, as previously stated, electricity. Different plants in the same network, however, may have a different cost structure due to different regional electricity costs. Other important factors in an optimization are the customer demands that are typically contractual and where substantial cost penalties may be incurred if demand rates are not met. Finally, distribution costs are a major component of the overall cost and are considered in planning optimal sourcing for customer deliveries.

Network optimization is done to minimize costs or maximize profits and requires models of both the plant operation and of the distribution. For a given demand at any point in time, the group of plant operation models is used to determine the production costs to make, for example, gaseous and liquid products from these plants. Models are also required to predict the distribution costs associated with transporting product to customers based on demands. An integration of the models is required to determine an optimal overall cost. For example, a plant that is inexpensive to produce liquid nitrogen may be unsuitable to provide certain customers based on high distribution costs.

To better illustrate the proposed process, schematic diagrams of an exemplary process according to embodiments of the invention are provided in FIGS. 1(a) through 1(g). FIG. 1(a) shows a schematic of the overall system and process according to one embodiment of the present invention, where a Modified Genetic Algorithm 102 is applied to a variety of incoming data feeds to arrive at a solution.

Figure 1B:
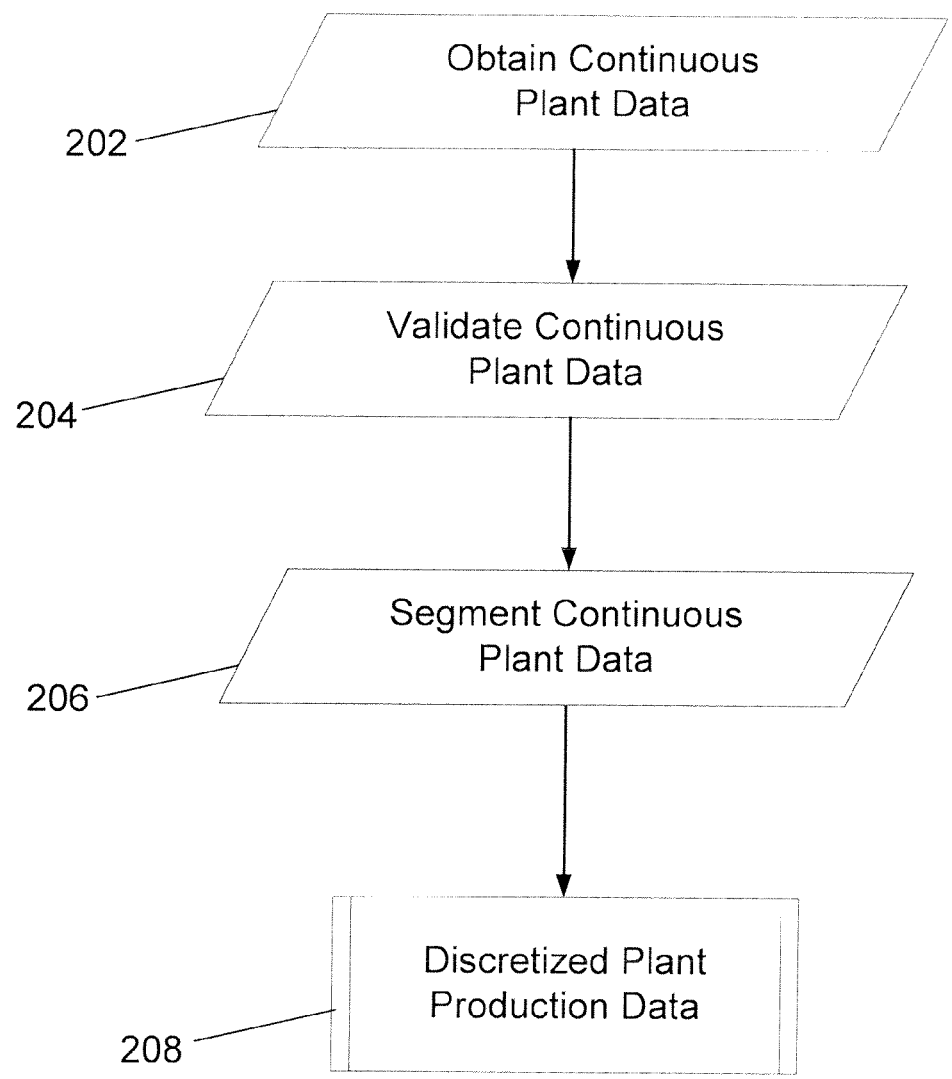
FIG. 1(b) is a flow diagram illustrating the process to obtain the Discretized Plant Production Data.

FIG. 1(b) illustrates one exemplary embodiment of the present invention to obtain and provide the Discretized Plant Production Data 208 of FIG. 1(a). As illustrated in FIG. 1(b), Continuous Plant Data is obtained in step 202 from various data sources, such as, for example plant data historians. This Continuous Plant Production Data obtained in step 202 may consist of various process parameters at the plant including production rates, product tank levels, electricity usage, etc. It is possible that the Continuous Plant Production Data obtained over an extensive time period may have outliers. The outliers may be present in the data in various forms including missing data, misaligned data in time, out of range data, etc. This outlier data should be removed from the Continuous Plant Production Data before the proposed approach is applied because such outlier data could lead to incorrect inputs to the optimizer. For example, incorrect plant models could be identified if misaligned data or out of range data in the analysis is included. Thus, the Continuous Plant Production Data obtained in step 202 is then validated in step 204 by removing and correcting all such outlier data based on a set of predetermined rules to produce a clean data-set. The rules here can comprise of steps like interpolating between closest values to substitute for missing values in a data-set, obtaining copies of historical data at different successive time stamps to correct for any misaligned data values and replacing an out of range value with the last obtained in-range value. The validated data-set of Continuous Plant Production Data is then segmented in step 206 to produce Discretized Plant Production Data. Such Discretized Plant Production Data is then provided in step 208 for input into the Modified Genetic Algorithm 102 as illustrated in FIG. 1(a).

Figure 1C:
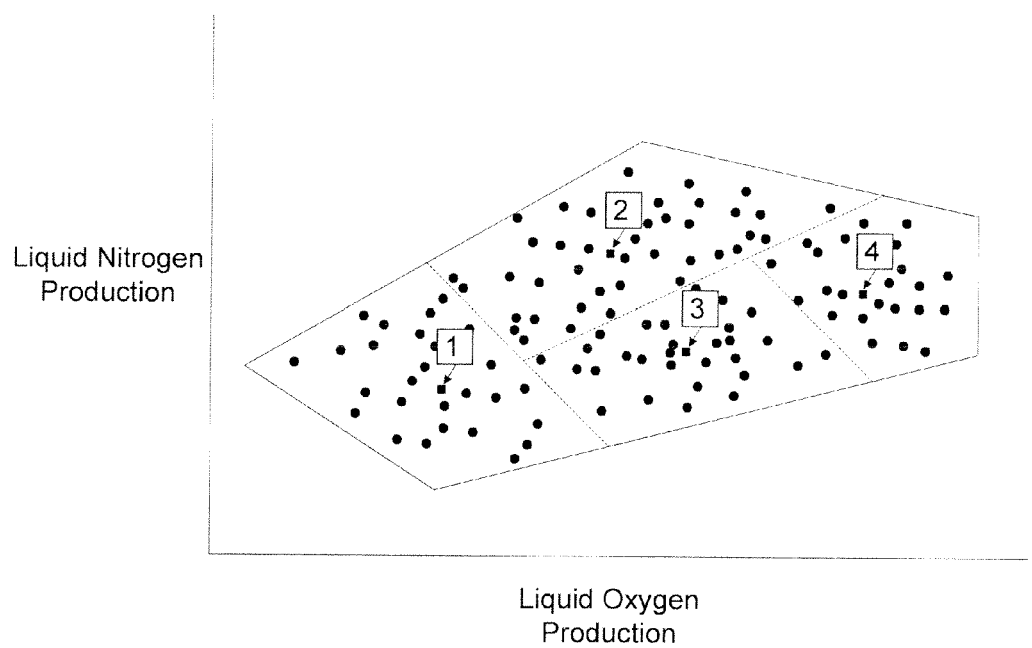
FIG. 1(c) is a graphical representation of the process to segment the continuous plant production data into modes.

The segmenting step 206 is further illustrated in FIG. 1(c), which shows an example of the segmented production for a single air separation plant where the production of Liquid Nitrogen (LIN) and Liquid Oxygen (LOX) are segmented into modes 1 through 4. Any given air separation plant will simultaneously produce LIN, LOX, and gaseous products and use electricity. Based on historical data, plant operating modes are selected for the production and electricity usage. Any plant can be segmented into "regions" of operation. For this example, it can be said that at any given point this plant will operate within one of these four modes. For a given mode, the production and electricity usage are based on physical attributes such as a compressor or a liquefier being turned on or off. Modes are selected based on these attributes, primarily the production rates and electricity usage, but other factors as well. Another example of a physical differentiator of the modes is a liquefier running on or off. For example, in FIG. 1(c), a plant may have one liquefier running in mode 1 and two liquefiers running in modes 2 through 4. The key factor to the segmentation step is reducing the number of possible production points from an infinite amount as depicted by the various points in FIG. 1(c) to a finite amount (i.e., four points (Mode 1, Mode 2, Mode 3, and Mode 4). The chosen mode is a representative point in the overall range. Some options to choose the designated point may be based on the mean of the production ranges or the median of the production ranges.

Figure 1D:
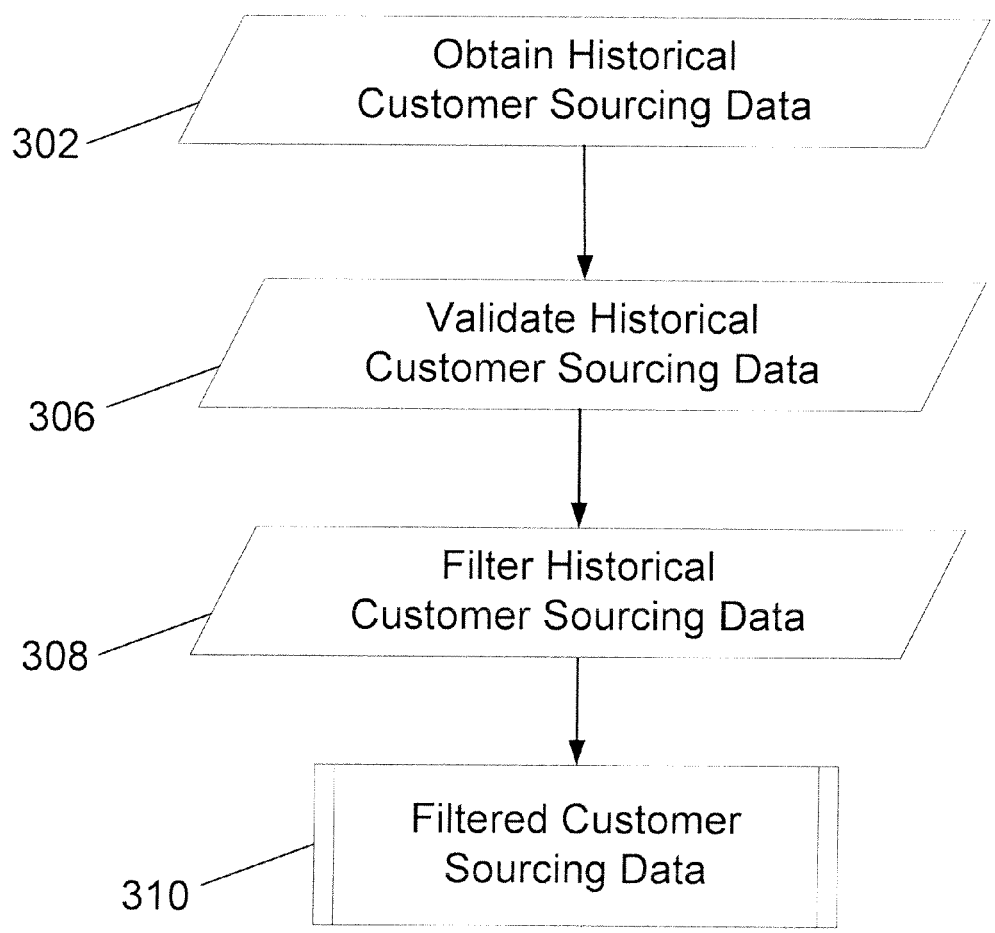
FIG. 1(d) is a flow diagram illustrating the process to obtain the Filtered Customer Sourcing Data.
Figure 1E:
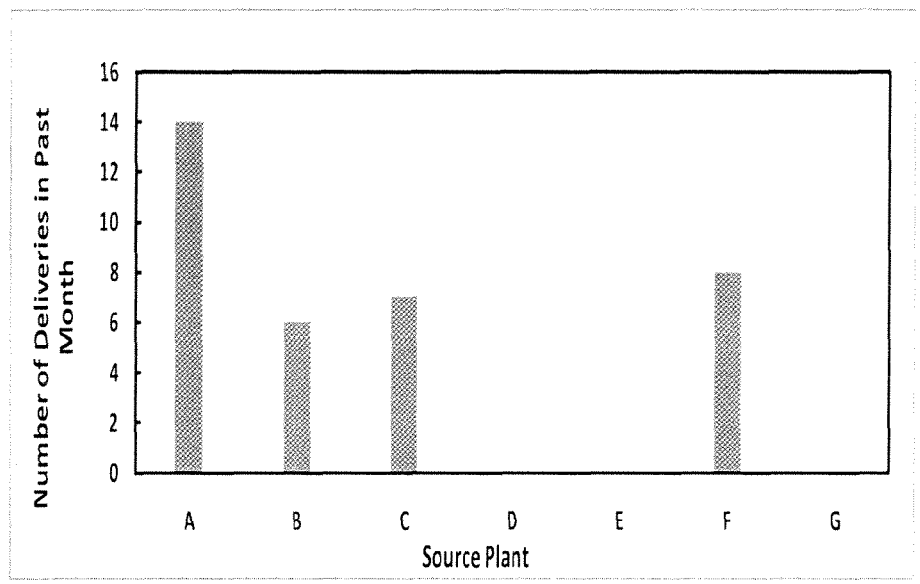
FIG. 1(e) is a graphical representation illustrating the deliveries to a customer in accordance with one embodiment of the current invention and shows the process of filtering the historical customer sourcing data

For obtaining and providing customer deliveries or Filtered Customer Sourcing Data, a similar approach is taken to reduce the decision space and ultimately the size of the problem to be solved as shown in FIG. 1(d). Historical Customer Sourcing Data is obtained in step 302 from business databases. It is possible that the Historical Customer Sourcing Data obtained over an extensive time period may also contain outliers. The outliers may be present in the data in various forms including missing data, misaligned data, out of range data, etc. This outlier data should be removed from the Historical Customer Sourcing Data before the proposed approach is applied. The Historical Customer Sourcing Data is, therefore, validated in step 306 by removing and correcting all such outlier data based on a set of predetermined rules to obtain a clean dataset. The clean dataset of Validated Historical Customer Sourcing Data is then filtered in step 308 to obtain Filtered Customer Sourcing Data, where such Filtered Customer Sourcing Data is then provided in step 310 as an input to the Modified Genetic Algorithm 102 as shown in FIG. 1(a). The filtering step 308 is further illustrated in FIG. 1(e), which shows the Historical Customer Sourcing Data or deliveries made to a customer from a list of Source Plants A, B, C, D, E, F, and G. In this case, only the plants which have sourced the customer in the past are selected as possible sources. Source Plants D, E, and G will be removed if this were an actual scenario assuming that their cost structure was not optimal. In the entire network, a customer may theoretically be sourced from any of the air separation plants. Only some of the plants will be feasible, however, based on their cost of delivery and their proximity to the customer. The basis of selecting which plants to consider as a source is different for each customer, but the decision is primarily based on the frequency of past sourcing and the predicted cost of delivery. If there is no history of delivery from a certain plant, but the cost is potentially favorable (as in the case of a new plant or customer), then the plant could be included. For a network of thousands of customers, this approach greatly reduces the number of points that the optimizer will consider, thereby making the optimizer more efficient. In addition, this approach makes the results more feasible and significantly increases the chances of implementation since the vast majority of customers will be sourced from a plant where they have previously received product in the past. Based on a cumulative sum of volumes delivered to any customer from a group of plants, a preferred list of plant sources is identified for each customer.

Figure 1F:
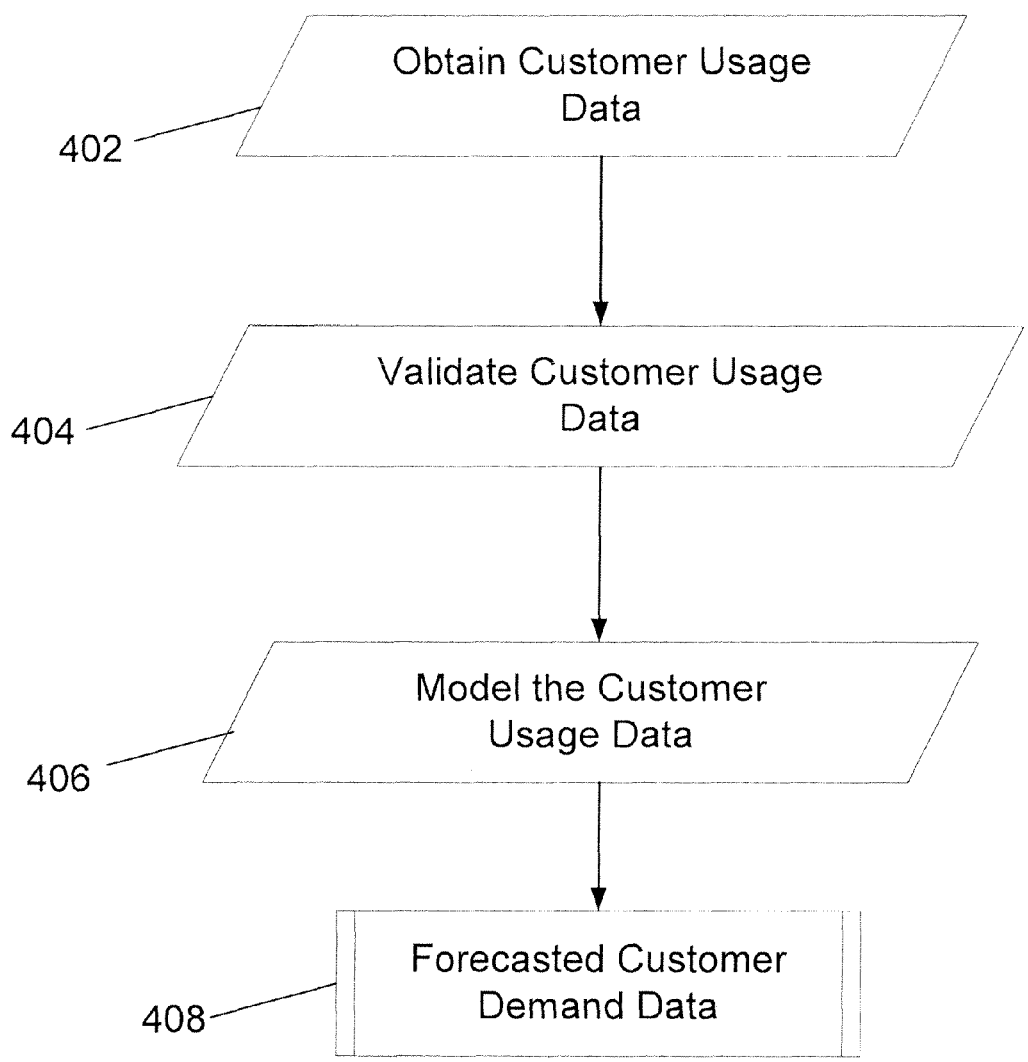
FIG. 1(f) is a flow diagram illustrating the process to obtain the Forecasted Customer Demand Data.

As illustrated in FIG. 1(a), another input to the Modified Genetic Algorithm 102 is the Forecasted Customer Demand Data 408. FIG. 1(f) illustrates the process for obtaining and providing the Forecasted Customer Demand Data for all customers for a time period in the future. The Forecasted Customer Demand Data can also include any product usage incurred internally, for example in the case of cryogenic liquids, liquid product can be vaporized as a backup source for meeting any contractually agreeable gaseous pipeline demands or can be used for internal plant needs. This time period can be variable in nature with a preferred choice of seven days into the future. The process starts with obtaining the Customer Usage Data in step 402. In the case of cryogenics, customer usage data may be obtained by reading tank levels remotely via telemetry. It is possible that the readings obtained for tank levels over an extensive time period might have outliers present in it. The outliers may be present in the data in various forms including missing data, misaligned data, out of range data, etc. This outlier data should be removed from the Customer Usage Data before the proposed approach is applied to it. In step 404, the example process validates the Customer Usage Data by removing and correcting all such outlier data based on a set of predetermined rules to obtain a clean dataset. The Validated Customer Usage Data is then modeled in step 406 to obtain the Forecasted Customer Demand Data. The Forecasted Customer Demand Data is then provided in step 408 as an input to the Modified Genetic Algorithm 102 as shown in FIG. 1(a). In cases where telemetry is not available for measuring customer tank levels, for example, historic usage patterns for a customer may be used.

Figure 1G:
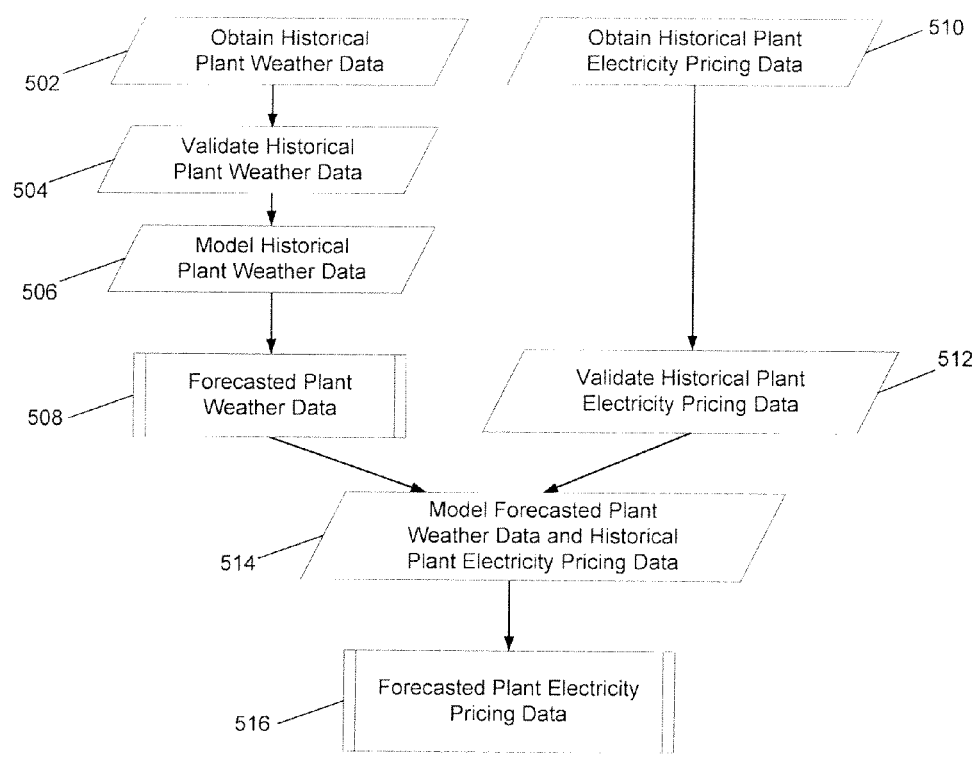
FIG. 1(g) is a flow diagram illustrating the process to obtain the Forecasted Plant Electricity Pricing data.

As illustrated in FIG. 1(a), another input to the Modified Genetic Algorithm 102 is the Forecasted Plant Electricity Pricing Data 516. FIG. 1(g) illustrates the process of obtaining and providing the Forecasted Plant Electricity Pricing Data for all plants for a given time period in the future. This time period can be variable in nature with a preferred choice of seven days into the future. The process starts with obtaining the Historical Plant Electricity Pricing Data in step 510 and Historical Plant Weather Data in Step 502. The historical plant electricity data can be obtained from the billing statements or from the utility company directly and the historical plant weather data can be obtained from external websites and internal databases created to store the data. It is possible that Historical Plant Electricity Pricing Data over an extensive time period might have outliers present in it. The outliers may be present in the data in various forms including missing data, misaligned data, etc. This outlier data should be removed from the Historical Plant Electricity Pricing Data before the proposed approach is applied. Thus, the Historical Plant Electricity Pricing Data is then validated in step 512 by removing and correcting all such outlier data based on a set of predetermined rules to obtain a clean dataset. It is possible that the Historical Plant Weather Data over an extensive time period might also have outliers present in it. The outliers may be present in the data in various forms including missing data, misaligned data, etc. This outlier data should be removed from the Historical Plant Weather Data before the proposed approach is applied. Thus, the Historical Plant Weather Data is then validated in step 504 by removing and correcting all such outlier data based on a set of predetermined rules to obtain a clean dataset. The Validated Historical Plant Weather Data is then modeled in step 506 to obtain the Forecasted Plant Weather Data in Step 508. The Forecasted Plant Weather Data and the Validated Historical Plant Electricity Pricing Data are used as inputs and are then modeled in step 514 to obtain the Forecasted Plant Electricity Pricing Data in Step 516, which serves as an input to the Modified Genetic Algorithm 102 as shown in FIG. 1(a).

Having reduced the decision space to a finite number in plant operation and distribution, the Modified Genetic Algorithm 102 is applied to solve the problem as illustrated in FIG. 1(a). Since the problem is reduced to Integer Programming, it is more feasible to solve using the Modified Genetic Algorithm 102. The solution time is short enough such that solutions may be implemented in a timely manner. In addition to the more efficient running of the optimization, using the Modified Genetic Algorithm 102 to solve the discrete variable set results in a more realistic representation of the system. Since the Modified Genetic Algorithm 102 produces a solution that may recommend a mode change, a more realistic set of decisions can be implemented to the system. For example, the Modified Genetic Algorithm 102 solution may recommend moving a plant from one operating mode to another (e.g. turn one of two liquefiers off). Other typical approaches using continuous production rates instead of discrete modes may result in an optimal solution whereby only very small production rate changes are recommended. Such changes to the plant operation may not be practical and therefore may not be implemented. Based on the disclosed approach, a solution will only suggest making perturbations to the system that are realistic and executable, namely operating mode changes. This aspect of the technique makes the probability of implementation greater resulting in a greater likelihood of savings to the company's bottom line.

The Modified Genetic Algorithm 102 is set up to solve in different time buckets. As an example in FIG. 1(a), the process of using the Modified Genetic Algorithm 102 is illustrated for 24-hour buckets 106 and 1-hour buckets 104. Solving the problem in 24-hour buckets for one week into the future (i.e. the optimizer gives seven results, once for each of the next seven days) instead of 1-hour buckets for one week into the future (i.e. the optimizer gives 168 results, one for each of the next 168 hours) further reduces the problem size and results in reduced solution time. Although the solution obtained at this stage is sub-optimal, it is still a vital piece of information for planners to gauge a course of action as far as decisions on production and distribution over a time period. This solution can be displayed on interface 108 (e.g., printer, computer screen, display module etc.). The solution quality may be made the most optimal by reducing the granularity of the solution time bucket (e.g., to 1-hour buckets 104), which takes more time to solve and as the solution from the 1-hour buckets 104 becomes available, the 1-hour bucket solution can replace the 24-hour bucket solution 106 and subsequently be displayed on interface 108. For example at time (0) zero (e.g., Sunday 00:00), if the solution is desired for seven days into the future, a calculation based on a 24-hour bucket 106 would result in Production and Distribution Decisions at intervals of 1 day (i.e., Monday 00:00, Tuesday 00:00, etc.), whereas a calculation based on a 1-hour bucket would result in Production and Distribution decisions at intervals of 1 hour (i.e., Sunday 01:00, Sunday 02:00, etc.).

Another benefit is that any new data that becomes available can be added to the modified GA optimizer to provide a more representative solution. This would include for example electricity costs for any plant or combination of plants, where the fluctuations in electricity price can happen at every fifteen minutes or less, which significantly impact the production costs incurred at the plant. This is discussed in greater detail using representative examples.

The following tables show a representative example of solving a combined production and distribution optimization problem for transporting cryogenic liquids to various customers. For simplification purposes, it has been assumed that the product under consideration is Liquid Nitrogen (LIN). Also it is assumed that there are only 2 plants: Plant 1 and Plant 2, and both of these plants have the capability to produce and ship the required LIN for a network of 4 customers (Customer 1, Customer 2, Customer 3 and Customer 4). The forecast period is assumed to be 4 hours. In the real time scenario, there are many additional factors that need to be considered (i.e., longer forecast period of typically seven days, existing inventories at each plant, etc.). For simplification and illustration purposes, we have assumed a starting inventory level of zero and that the number of vehicles available to transport the product is unlimited at each plant.

Table 1 shows the plant production data along with the associated power usage data for the different modes of operation for Plants 1 and 2.

TABLE 1

Discretized Plant Production Data

| Modes (Plant 1) | Plant 1 Percentage Operation | Production (Tons) (Plant 1) | Electricity Usage (kW) (Plant 1) |
|---|---|---|---|
| 0 | Shutdown | 0 | 0 |
| 1 | 1 Liquefier on | 10 | 8000 |
| 2 | 1 Liquefier on (Max LIN) | 13 | 11000 |
| 3 | 2 Liquefiers on | 17 | 18000 |

| Modes (Plant 2) | Plant 2 Percentage Operation | Production (Tons) (Plant 2) | Electricity Usage (kW) (Plant 2) |
|---|---|---|---|
| 0 | Shutdown | 0 | 0 |
| 1 | 1 Liquefier on | 11 | 7500 |
| 2 | 1 Liquefier on (Max LIN) | 15 | 15000 |
| 3 | 2 Liquefiers on | 18 | 22000 |

Here the plant modes have been chosen to reflect whether particular plant equipment is on or off. These modes encompass a wide variety of production rates as illustrated in FIG. 1(c). As shown in Table 1, for both plants 1 and 2, Mode 0 represents a shutdown scenario in which the plants make no LIN and use no electricity. Modes 1 and 2 represent cases when one liquefier is on, but Mode 2 produces more LIN and uses more electricity than Mode 1 because different equipment runs harder to produce more product. Finally, Mode 3 represents the case when two liquefiers are on and results in the mode with the largest production rates and power usages. The production rates listed for each mode reflect the average production rate over a representative time frame and, thus, include a wide range of production values. The infinite production scenarios are, therefore, limited and accurately represented by the operating modes, thereby decreasing the size of the optimization problem. The electricity usage listed for each mode reflects the total electricity consumed when the plant is running in that mode. These electricity usage readings are obtained from power meters installed at the plant to track electricity usage. Once the product has been made at either of the plants, it has to then be transported to various customers via trucks. The costs in Table 2 reflect the distribution costs incurred in taking a trip to specific customers from either of the plants.

TABLE 2

Plant-Customer Distribution Costs ($/Trip)

|  | Customer 1 | Customer 2 | Customer 3 | Customer 4 |
|---|---|---|---|---|
| Plant 1 | 278 | 396 | 435 | 382 |
| Plant 2 | 340 | 355 | 300 | 318 |

This data can be obtained by using average measures such as total distribution dollars divided by total miles driven from a plant to give an average dollar per mile value by plant. These averages can then be multiplied by the distance between any customer and plant pairing to get the typical trip costs incurred. A more accurate distribution model can also include other factors such as volume delivered, number of stops made in that trip, etc. as illustrated in International Patent Application No. PCT/US10/35973 incorporated herein by reference in its entirety.

Table 3 illustrates the Forecasted Customer Demand Data for each hour (1 to 4).

TABLE 3

Forecasted Customer Demand Data at different hours (tons)

| Hours | 1 | 2 | 3 | 4 |
|---|---|---|---|---|
| Customer 1 | 5 |  |  | 10 |
| Customer 2 | 10 | 12 |  | 10 |
| Customer 3 | 10 | 12 | 14 |  |
| Customer 4 |  |  | 10 | 10 |
| Total Customer Demand | 25 | 24 | 24 | 30 |

Typically readings for inventory of LIN, LOX, and other cryogenic products can be obtained remotely from customers by using telemetry techniques. Here the customer tank values at regular intervals are obtained using remote telemetry and these are fit to a time series model to forecast the demand for the customers at each hour. An average value or historical usage patterns may be used for customers for whom telemetry values are not available. In the example shown, telemetry values were obtained for each of the customers at regular frequencies, a time series model was fit to these values, and forecasts were obtained for the customer demand at each successive hour. For example, Customer 1 is forecasted to need 5 tons at hour 1 and 10 tons at hour 4. The total customer demand for the full four hours is 103 tons.

Table 4 shows the forecasted electricity pricing data for each plant for the next four hours at the start of optimization (t=0 minutes).

TABLE 4

Forecasted Electricity Prices (cents/kWh) at Time = 0 minutes

|  | Hour 1 | Hour 2 | Hour 3 | Hour 4 |
|---|---|---|---|---|
| Plant 1 | 3.2 | 3.5 | 5 | 4.2 |
| Plant 2 | 4 | 2.8 | 3.1 | 3.8 |

As previously noted, this information changes rapidly. For some plants, the electricity price changes every fifteen minutes. Historic Plant Electricity Pricing Data and Historical Plant Weather Data were compiled for all the plants and their associated electricity grids, and a time-series model was used to forecast electricity prices for the future. As will be shown in Tables 6-8, this electricity price is dynamic and can undergo sudden swings in value depending on weather, the load on the electricity grid, and other factors.

The Modified Genetic Algorithm 102 executes in the following manner. The first step is the creation of the initial population, wherein a random initial population is created. Here the initial population is comprised of both random current operating modes and previous solution modes. This is followed by scoring each population member, where the Modified Genetic Algorithm 102 will score or compute the fitness function of each population member. From the scores, the members having the best fitness values are selected as "elite" members and are passed on to the next generation. Following this step, the Modified Genetic Algorithm 102 produces children members from the parent members in the population, which can be produced either by mutation (random changes) or by crossover which refers to a combination of two members of the previous population. The next generation is then replaced by the children of the current generation. This generation cycle repeats itself until any of the pre-specified stopping criteria are met.

Table 5 shows the results obtained from the Modified Genetic Algorithm 102 to solve the combined production-distribution optimization problem together where the overall objective is the reduction of total cost of the system.

TABLE 5

Case 1: Results from Modified Genetic Algorithm

|  | Hour 1 | Hour 2 | Hour 3 | Hour 4 |
|---|---|---|---|---|
| Plant 1 | | | | |
| Predicted Production Modes | 1 | 2 | 2 | 1 |
| Production Rates (tons/hr) | 10 | 13 | 13 | 10 |
| Electricity Usage (kW) | 8000 | 11000 | 11000 | 8000 |
| Distribution Plan (tons/hr) | 10 | 12 | 14 | 10 |
| Plant 2 | | | | |
| Predicted Production Modes | 2 | 3 | 3 | 2 |
| Production Rates (tons/hr) | 15 | 18 | 18 | 15 |
| Electricity Usage (kW) | 15000 | 22000 | 22000 | 15000 |
| Distribution Plan (tons/hr) | 15 | 12 | 10 | 20 |
| Totals | | | | |
| Total Production Cost ($) | 3995 | | | |
| Total Distribution Cost ($) | 3436 | | | |
| Total Cost ($) | 7431 | | | |

The Modified Genetic Algorithm 102 provides solutions for the plant production for the next four hours in terms of plant modes and their associated production rates and electricity usage. In order to minimize total production and distribution costs, the Modified Genetic Algorithm 102 suggests that Plant 1 should operate in Mode 1 the first hour, Mode 2 the next two hours, and Mode 1 the fourth hour. The solution also suggests that Plant 2 should operate in Mode 2 the first hour, Mode 3 the next two hours, and Mode 2 the fourth hour. In terms of distribution in this example, all the plants can source all the customers because they have historically done so. None of the plant-customer pairings have been filtered out.

The results obtained from the Modified Genetic Algorithm 102 also show the distribution plans for each hour from each plant to meet the total customer demand of 103 tons over the next four hours. For example, Plant 1 will provide 10 tons the first hour, 12 tons the second hour, 14 tons the third hour, and 10 tons the fourth hour. Implementation of these decisions will result in the minimum production and distribution costs of $7431, out of which $3995 is the production cost (predominantly electricity expenses) and $3436 is the distribution cost to deliver product to the customers.

However, as previously stated, the electricity price can change every 15 minutes. Traditionally, an optimizer would still be running when the electricity price changes and such price change would not be incorporated into the data midstream. If for example, it takes one hour for the optimizer to run, the optimizer would still be running when this electricity price changed multiple times over the course of the hour, and this new electricity price change traditionally would not be incorporated into the optimization run mid-stream. Instead, this new data would only be used when the optimization completed its one hour run, and then the optimization would be kicked off again with the new electricity price at that point. Use of the Modified Genetic Algorithm 102 allows use of this "intermediate" data to more accurately perform the analysis.

Tables 6-8 show a sample change in forecasted electricity usage at each hour for Plant 1 and Plant 2 using the dynamic electricity data available at each 15 minute time interval.

TABLE 6

Forecasted Electricity Prices (cents/kWh) available at Time = 15 minutes

|  | Hour 1 | Hour 2 | Hour 3 | Hour 4 |
|---|---|---|---|---|
| Plant 1 | 3.2 | 3.5 | 5 | 4 |
| Plant 2 | 4 | 3 | 3.1 | 4 |

Table 6 shows the forecasted electric price at each plant using the electricity price data available 15 minutes after the start of the optimization.

TABLE 7

Forecasted Electricity Prices (cents/kWh) available at Time = 30 minutes

|  | Hour 1 | Hour 2 | Hour 3 | Hour 4 |
|---|---|---|---|---|
| Plant 1 | 3 | 3.5 | 5 | 3.8 |
| Plant 2 | 4 | 3.2 | 3.1 | 4 |

Table 7 shows the forecasted electricity price using the electricity price data available 30 minutes after the start of the optimization.

TABLE 8

Forecasted Electricity Prices (cents/kWh) available at Time = 45 minutes

|  | Hour 1 | Hour 2 | Hour 3 | Hour 4 |
|---|---|---|---|---|
| Plant 1 | 2.8 | 3.5 | 5 | 3.6 |
| Plant 2 | 4 | 3.2 | 3.1 | 4 |

Table 8 shows the forecasted electricity price using the electricity price data available 45 minutes after the start of the optimization.

Use of this intermediate data in the Modified Genetic Algorithm 102 results in the solution shown in Table 9.

TABLE 9

Case 2 Results from the Modified Genetic Algorithm

|  | Hour 1 | Hour 2 | Hour 3 | Hour 4 |
|---|---|---|---|---|
| Plant 1 | | | | |
| Predicted Production Modes | 3 | 1 | 1 | 1 |
| Production Rates (tons/hr) | 17 | 10 | 10 | 10 |
| Electricity Usage (kW) | 18000 | 8000 | 8000 | 8000 |
| Distribution Plan (tons/hr) | 15 | 12 | 10 | 10 |
| Plant 2 | | | | |
| Predicted Production Modes | 2 | 2 | 2 | 1 |
| Production Rates (tons/hr) | 15 | 15 | 15 | 11 |
| Electricity Usage (kW) | 15000 | 15000 | 15000 | 7500 |
| Distribution Plan (tons/hr) | 10 | 12 | 14 | 20 |
| Total | | | | |
| Total Production Cost ($) | 3317 | | | |
| Total Distribution Cost ($) | 3500 | | | |
| Total Cost ($) | 6817 | | | |

The production and distribution costs for this case were calculated to be $6,817 where $3,317 is the production cost (primarily electricity expenses) and $3,500 is the distribution cost to deliver the product to the customers. Note that use of the intermediate data results in a different solution than the solution shown in Table 5. Plant production modes as well as the distribution plan for the next four hours are different. If the intermediate data had not been incorporated when it became available, the planners would have implemented a sub-optimal, i.e. more costly, plan. As previously stated, traditional techniques used such as MINLP cannot use intermediate data incorporated mid-stream. Instead, a traditional optimizer must be re-run from the beginning with the new data, making solutions unavailable in reasonable time frames. Re-running of an optimizer is not cost effective because a delay in decision making on the order of hours may incur significant costs. Due to the discretization and segmentation of plant production data into modes and the limiting of customer sourcing to only allowed sources, the modified GA solves in a reasonable time frame for quick decision making. Furthermore, the optimizer result is a practical, implementable solution because the modes are linked to a fundamental state of the system (liquefier being on or off, etc.). For example, Plant 1 will run 2 liquefiers the first hour and then shutdown one liquefier for the remaining three hours.

Figure 2:
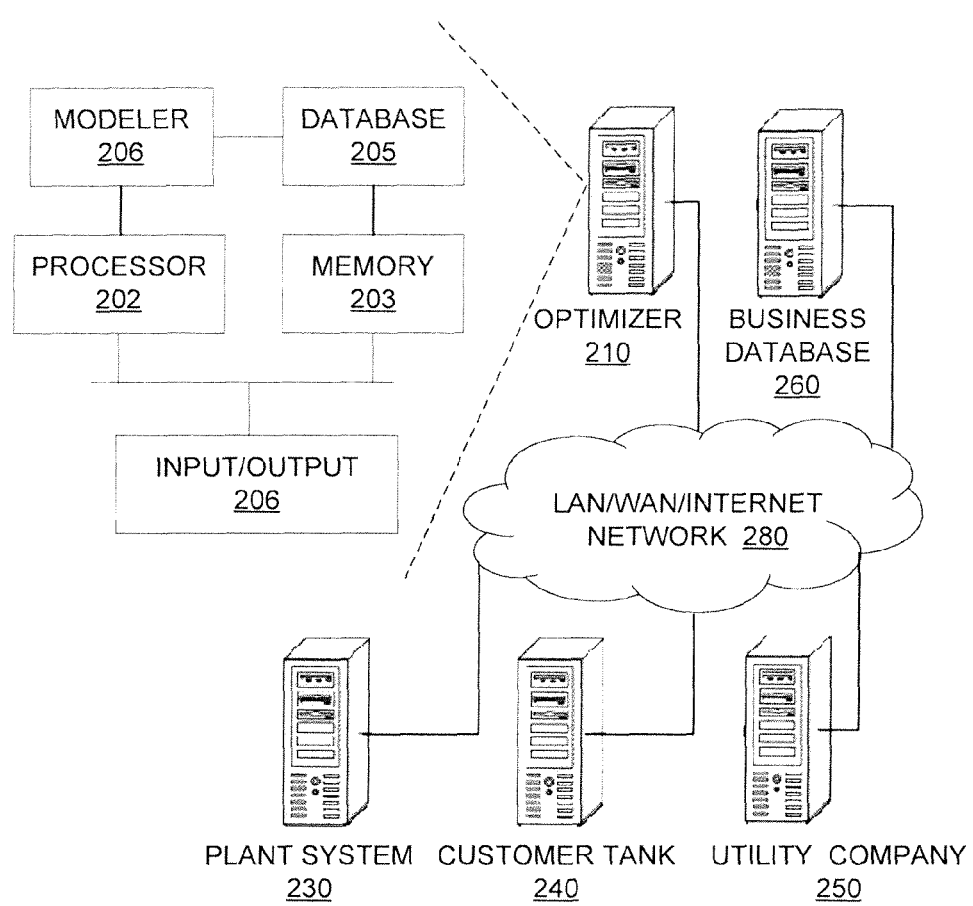
FIG. 2 illustrates one exemplary system, in accordance with one embodiment of the current invention.

FIG. 2 illustrates one example system, according to one embodiment of the present invention. The example system may include an optimizer 210. The optimizer 210 may be a server (e.g., a high power general purpose computer), a plurality of local servers, and/or a plurality of geographically distributed servers. Each server, including optimizer 210, may have one or more system memories 203, e.g., Random Access Memory (RAM), Read Only Memory (ROM), hard disks, solid-state drives, disk arrays, and any number of other data storage technologies. One or more databases 205 may be constructed within one or more of the memory arrangements 203. The memory may be connected via a bus to one or more processors 202. This may include one or more general purpose electronic processors, special purposes processors, single or multi-core processors, other suitable data processing arrangements, and/or any combination of the above. The bus may also include one or more input or output devices 206, including network connections, monitors, data cables, keyboards, mice, touch-pads, touch screens, speakers, and/or any number of other input and/or output devices. Optimizer 210 may also have a modeler module 206, connected to the memory for storage and processor for execution. The optimizer 210 may be connected via a network 280 (e.g., the Internet) to servers located at, for example, plant locations 230, customer tank locations 240, utility company locations 250, and/or customer locations 260. These connections may provide communication (e.g., email), software functions (e.g., invoicing), and data sharing (e.g., operational statistics).

While aspects of the present invention have been described in connection with the preferred embodiments of the various figures, it is to be understood that other similar embodiments may be used or modifications and additions may be made to the described embodiment for performing the same function of the present invention without deviating there from. The claimed invention, therefore, should not be limited to any single embodiment, but rather should be construed in breadth and scope in accordance with the appended claims. For example, the following aspects should also be understood to be a part of this disclosure:

Aspect 1. A computer-implemented method for producing and distributing at least one product from at least one plant to at least one customer, the method comprising the steps of:
  a. obtaining with an electronic processor from an electronic data repository continuous plant data from the at least one plant;
  b. segmenting the continuous plant data with the electronic processor into discrete plant production modes to obtain discretized plant production data;
  c. obtaining with the electronic processor from an electronic data repository historical customer sourcing data from the at least one customer;
  d. filtering the historical customer sourcing data with the electronic processor to obtain filtered customer sourcing data;
  e. obtaining with the electronic processor from an electronic data repository customer usage data;
  f. modeling the customer usage data for at least one time with the electronic processor to obtain forecasted customer demand data;
  g. obtaining with the electronic processor from an electronic data repository historical plant weather data for the at least one plant;
  h. modeling the historical plant weather data for the at least one plant for at least one time with the electronic processor to obtain forecasted plant weather data;
  i. obtaining with the electronic processor from an electronic data repository historical plant electricity pricing data for the at least one plant;
  j. modeling the historical plant electricity pricing data and the forecasted plant weather data for the at least one plant for at least one time with the electronic processor to obtain forecasted plant electricity pricing data;
  k. inputting with the electronic processor the discretized plant production data, filtered customer sourcing data, forecasted customer demand data, and forecasted plant electricity pricing data into the modified genetic algorithm;
  l. solving with the electronic processor the modified genetic algorithm based on the inputs of step k; and
  m. outputting with the electronic processor the solution to the modified genetic algorithm to an interface.

Aspect 2. The method of Aspect 1, further comprising prior to segmenting the continuous plant data with the electronic processor into discrete plant production modes to obtain discretized plant production data, validating the obtained continuous plant data with the electronic processor from the at least one plant.

Aspect 3. The method of any one of Aspects 1 or 2, further comprising prior to filtering the historical customer sourcing data with the electronic processor to obtain filtered customer sourcing data, validating the obtained historical customer sourcing data with the electronic processor from the at least one customer.

Aspect 4. The method of any one of Aspects 1-3, further comprising prior to modeling the customer usage data with the electronic processor, validating the obtained customer usage data with the electronic processor.

Aspect 5. The method of any one of Aspects 1-4, further comprising prior to modeling the historical plant weather data with the electronic processor, validating the obtained historical plant weather data with the electronic processor.

Aspect 6. The method of Aspect 5, wherein the historical plant weather data comprises at least one of a measure of temperature, humidity, wind speed, and pressure.

Aspect 7. The method of any one of Aspects 1-6, further comprising prior to modeling the historical plant electricity pricing data with the electronic processor, validating the obtained historical plant electricity pricing data with the electronic processor.

Aspect 8. The method of any one of Aspects 1-7, wherein the solution from the modified genetic algorithm is for at least a twenty-four hour period.

Aspect 9. The method of any one of Aspects 1-8, further comprising performing steps a through k to obtain at least one intermediate discretized plant production data, filtered customer sourcing data, forecasted customer demand data, and forecasted plant electricity pricing data; inputting the at least one intermediate discretized plant production data, filtered customer sourcing data, forecasted customer demand data and forecasted plant electricity pricing data into the modified genetic algorithm; solving the modified genetic algorithm with the electronic processor to obtain a revised solution; and outputting the revised solution with the electronic processor to the interface.

Aspect 10. The method of Aspect 9, wherein the revised solution is for a time period less than or equal to a twenty-four hour time period.

Aspect 11. The method of Aspect 10, wherein the revised solution is calculated continuously.

Aspect 12. A computer system for producing and distributing at least one product from at least one plant to at least one customer, the system comprising:
   an electronic data repository; and
   an electronic processor, configured to:
   a. obtain from the electronic data repository continuous plant data from the at least one plant;
   b. segment the continuous plant data into discrete plant production modes to obtain discretized plant production data;
   c. obtain from the electronic data repository historical customer sourcing data from the at least one customer;
   d. filter the historical customer sourcing data to obtain filtered customer sourcing data;
   e. obtain from the electronic data repository customer usage data;
   f. model the customer usage data for at least one time to obtain forecasted customer demand data;
   g. obtain from the electronic data repository historical plant weather data for the at least one plant;
   h. model the historical plant weather data for the at least one plant for at least one time to obtain forecasted plant weather data;
   i. obtain from the electronic data repository historical plant electricity pricing data for the at least one plant;
   j. model the historical plant electricity pricing data and the forecasted plant weather data for the at least one plant for at least one time to obtain forecasted plant electricity pricing data;
   k. input the discretized plant production data, filtered customer sourcing data, forecasted customer demand data, and forecasted plant electricity pricing data into the modified genetic algorithm;
   l. solve the modified genetic algorithm based on the inputs of step k; and
   m. output the solution to the modified genetic algorithm to an interface.

Aspect 13. The system of Aspect 12, wherein the solution to the modified genetic algorithm is for at least a twenty-four hour period.

Aspect 14. The system of 12 or 13, wherein the electronic processor further performs steps a through k to obtain at least one intermediate discretized plant production data, filtered customer sourcing data, forecasted customer demand data and forecasted plant electricity pricing data; inputs the at least one intermediate discretized plant production data, filtered customer sourcing data, forecasted customer demand data and forecasted plant electricity pricing data into the modified genetic algorithm, solves the modified genetic algorithm to obtain a revised solution; and outputs the revised solution to the interface.

Aspect 15. The method of Aspect 14, wherein the revised solution is for a time period less than or equal to a twenty-four hour time period.

Aspect 16. The method of Aspect 14 or 15, wherein the revised solution is calculated continuously.

Aspect 17. A computer-readable storage medium encoded with instructions configured to be executed by an electronic processor, the instructions which, when executed by the electronic processor, cause the performance of a method for producing and distributing at least one product from at least one plant to at least one customer, the method comprising:
   a. obtaining with the electronic processor from an electronic data repository continuous plant data from the at least one plant;
   b. segmenting the continuous plant data with the electronic processor into discrete plant production modes to obtain discretized plant production data;
   c. obtaining with the electronic processor from an electronic data repository historical customer sourcing data from the at least one customer;
   d. filtering the historical customer sourcing data with the electronic processor to obtain filtered customer sourcing data;
   e. obtaining with the electronic processor from an electronic data repository customer usage data;
   f. modeling the customer usage data for at least one time with the electronic processor to obtain forecasted customer demand data;
   g. obtaining with the electronic processor from an electronic data repository historical plant weather data for the at least one plant;
   h. modeling the historical plant weather data for the at least one plant for at least one time with the electronic processor to obtain forecasted plant weather data;
   i. obtaining with the electronic processor from an electronic data repository historical plant electricity pricing data for the at least one plant;
   j. modeling the historical plant electricity pricing data and the forecasted plant weather data for the at least one plant for at least one time with the electronic processor to obtain forecasted plant electricity pricing data;
   k. inputting with the electronic processor the discretized plant production data, filtered customer sourcing data, forecasted customer demand data, and forecasted plant electricity pricing data into the modified genetic algorithm;
   l. solving with the electronic processor the modified genetic algorithm based on the inputs of step k; and
   m. outputting with the electronic processor the solution to the modified genetic algorithm to an interface.

Aspect 18. The method of Aspect 17, wherein the solution to the modified genetic algorithm is for at least a twenty-four hour period.

Aspect 19. The method of Aspect 17 or 18, wherein the electronic processor further performs steps a through k to obtain at least one intermediate discretized plant production data, filtered customer sourcing data, forecasted customer demand data and forecasted plant electricity pricing data; inputs the at least one intermediate discretized plant production data, filtered customer sourcing data, forecasted customer demand data and forecasted plant electricity pricing data into the modified genetic algorithm; solves the modified genetic algorithm to obtain a revised solution; and outputs the revised solution to the interface.

Aspect 20. The method of Aspect 19, wherein the revised solution is for a time period less than or equal to a twenty-four hour time period.

Aspect 21. The method of Aspect 19 or 20, wherein the revised solution is calculated continuously.

The invention claimed is:

1. A computer-implemented method for producing and distributing at least one product from at least one plant to at least one customer, the method comprising the steps of:
 a. obtaining with an electronic processor from an electronic data repository continuous plant data from the at least one plant;
 b. segmenting the continuous plant data with the electronic processor into discrete plant production modes to obtain discretized plant production data;
 c. obtaining with the electronic processor from an electronic data repository historical customer sourcing data from the at least one customer;
 d. filtering the historical customer sourcing data with the electronic processor to obtain filtered customer sourcing data;
 e. obtaining with the electronic processor from an electronic data repository customer usage data;
 f. modeling the customer usage data for at least one time with the electronic processor to obtain forecasted customer demand data;
 g. obtaining with the electronic processor from an electronic data repository historical plant weather data for the at least one plant;
 h. modeling the historical plant weather data for the at least one plant for at least one time with the electronic processor to obtain forecasted plant weather data;
 i. obtaining with the electronic processor from an electronic data repository historical plant electricity pricing data for the at least one plant;
 j. modeling the historical plant electricity pricing data and the forecasted plant weather data for the at least one plant for at least one time with the electronic processor to obtain forecasted plant electricity pricing data;
 k. inputting with the electronic processor the discretized plant production data, filtered customer sourcing data, forecasted customer demand data, and forecasted plant electricity pricing data into a modified genetic algorithm;
 l. commencing execution of the modified genetic algorithm at a first time;
 m. receiving intermediate data, the intermediate data comprising intermediate discretized plant production data, intermediate filtered customer sourcing data, intermediate forecasted customer demand data, and intermediate forecasted plant electricity pricing data, the intermediate data being generated after the first time;
 n. inputting with the electronic processor the intermediate data into the modified genetic algorithm, while the modified genetic algorithm is executing;
 o. solving with the electronic processor the modified genetic algorithm based on the inputs of steps k and n; and
 p. outputting with the electronic processor a solution to the modified genetic algorithm to an interface.

2. The method of claim 1, further comprising prior to segmenting the continuous plant data with the electronic processor into discrete plant production modes to obtain discretized plant production data, validating the obtained continuous plant data with the electronic processor from the at least one plant.

3. The method of claim 1, further comprising prior to filtering the historical customer sourcing data with the electronic processor to obtain filtered customer sourcing data, validating the obtained historical customer sourcing data with the electronic processor from the at least one customer.

4. The method of claim 1, further comprising prior to modeling the customer usage data with the electronic processor, validating the obtained customer usage data with the electronic processor.

5. The method of claim 1, further comprising prior to modeling the historical plant weather data with the electronic processor, validating the obtained historical plant weather data with the electronic processor.

6. The method of claim 5, wherein the historical plant weather data comprises at least one of a measure of temperature, humidity, wind speed, and pressure.

7. The method of claim 1, further comprising prior to modeling the historical plant electricity pricing data with the electronic processor, validating the obtained historical plant electricity pricing data with the electronic processor.

8. The method of claim 1, wherein the solution from the modified genetic algorithm is for at least a twenty-four hour period.

9. The method of claim 1, wherein the solution is for a time period less than or equal to a twenty-four hour time period.

10. The method of claim 1, wherein the solution is calculated continuously.

11. A computer system for producing and distributing at least one product from at least one plant to at least one customer, the system comprising:
 an electronic data repository; and
 an electronic processor, configured to:
  a. obtain from the electronic data repository continuous plant data from the at least one plant;
  b. segment the continuous plant data into discrete plant production modes to obtain discretized plant production data;
  c. obtain from the electronic data repository historical customer sourcing data from the at least one customer;
  d. filter the historical customer sourcing data to obtain filtered customer sourcing data;
  e. obtain from the electronic data repository customer usage data;
  f. model the customer usage data for at least one time to obtain forecasted customer demand data;
  g. obtain from the electronic data repository historical plant weather data for the at least one plant;
  h. model the historical plant weather data for the at least one plant for at least one time to obtain forecasted plant weather data;
  i. obtain from the electronic data repository historical plant electricity pricing data for the at least one plant;
  j. model the historical plant electricity pricing data and the forecasted plant weather data for the at least one plant for at least one time to obtain forecasted plant electricity pricing data;
  k. input the discretized plant production data, filtered customer sourcing data, forecasted customer demand data, and forecasted plant electricity pricing data into a modified genetic algorithm;
  l. commence execution of the modified genetic algorithm at a first time;
  m. receive intermediate data, the intermediate data comprising intermediate discretized plant production data, intermediate filtered customer sourcing data, intermediate forecasted customer demand data, and intermediate forecasted plant electricity pricing data, the intermediate data being generated after the first time;

n. input with the electronic processor the intermediate data into the modified genetic algorithm, while the modified genetic algorithm is executing;

o. solve the modified genetic algorithm based on the inputs of steps k and n; and p. output a solution to the modified genetic algorithm to an interface.

12. The system of claim 11, wherein the solution to the modified genetic algorithm is for at least a twenty-four hour period.

13. The system of claim 11, wherein the solution is for a time period less than or equal to a twenty-four hour time period.

14. The system of claim 11, wherein the solution is calculated continuously.

15. A non-transitory computer-readable storage medium encoded with instructions configured to be executed by an electronic processor, the instructions which, when executed by the electronic processor, cause the performance of a method for producing and distributing at least one product from at least one plant to at least one customer, the method comprising:

a. obtaining with the electronic processor from an electronic data repository continuous plant data from the at least one plant;

b. segmenting the continuous plant data with the electronic processor into discrete plant production modes to obtain discretized plant production data;

c. obtaining with the electronic processor from an electronic data repository historical customer sourcing data from the at least one customer;

d. filtering the historical customer sourcing data with the electronic processor to obtain filtered customer sourcing data;

e. obtaining with the electronic processor from an electronic data repository customer usage data;

f. modeling the customer usage data for at least one time with the electronic processor to obtain forecasted customer demand data;

g. obtaining with the electronic processor from an electronic data repository historical plant weather data for the at least one plant;

h. modeling the historical plant weather data for the at least one plant for at least one time with the electronic processor to obtain forecasted plant weather data;

i. obtaining with the electronic processor from an electronic data repository historical plant electricity pricing data for the at least one plant;

j. modeling the historical plant electricity pricing data and the forecasted plant weather data for the at least one plant for at least one time with the electronic processor to obtain forecasted plant electricity pricing data;

k. inputting with the electronic processor the discretized plant production data, filtered customer sourcing data, forecasted customer demand data, and forecasted plant electricity pricing data into a modified genetic algorithm;

l. commencing execution of the modified genetic algorithm at a first time;

m. receiving intermediate data, the intermediate data comprising intermediate discretized plant production data, intermediate filtered customer sourcing data, intermediate forecasted customer demand data, and intermediate forecasted plant electricity pricing data, the intermediate data being generated after the first time;

n. inputting with the electronic processor the intermediate data into the modified genetic algorithm, while the modified genetic algorithm is executing;

o. solving with the electronic processor the modified genetic algorithm based on the inputs of steps k and n; and p. outputting with the electronic processor a solution to the modified genetic algorithm to an interface.

16. The non-transitory computer-readable storage medium of claim 15, wherein the solution to the modified genetic algorithm is for at least a twenty-four hour period.

17. The non-transitory computer-readable storage medium of claim 15, wherein the solution is for a time period less than or equal to a twenty-four hour time period.

18. The non-transitory computer-readable storage medium of claim 15, wherein the solution is calculated continuously.

* * * * *